(12) United States Patent
Rasor et al.

(10) Patent No.: US 9,946,592 B2
(45) Date of Patent: Apr. 17, 2018

(54) DUMP DATA COLLECTION MANAGEMENT FOR A STORAGE AREA NETWORK

(71) Applicant: International Business Machines Corporation, Armonk, NY (US)

(72) Inventors: Louis A. Rasor, Tucson, AZ (US); Juan J. Ruiz, Daly City, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 77 days.

(21) Appl. No.: 15/043,430

(22) Filed: Feb. 12, 2016

(65) Prior Publication Data
US 2017/0235627 A1    Aug. 17, 2017

(51) Int. Cl.
G06F 11/00    (2006.01)
G06F 11/07    (2006.01)

(52) U.S. Cl.
CPC ...... *G06F 11/0778* (2013.01); *G06F 11/0709* (2013.01); *G06F 11/079* (2013.01); *G06F 11/0727* (2013.01); *G06F 11/0751* (2013.01)

(58) Field of Classification Search
CPC ............. G06F 11/0778; G06F 11/0709; G06F 11/0727; G06F 11/0751; G06F 11/079; G06F 11/0781; G06F 11/0784; G06F 11/0787
USPC .......................................... 714/45, 38.11, 37
See application file for complete search history.

(56) References Cited

U.S. PATENT DOCUMENTS

| | | | |
|---|---|---|---|
| 5,119,377 A | 6/1992 | Cobb et al. | |
| 6,182,243 B1 | 1/2001 | Berthe et al. | |
| 6,643,802 B1 * | 11/2003 | Frost | G06F 11/0712 714/31 |
| 7,496,794 B1 | 2/2009 | Eastham et al. | |
| 7,543,187 B1 | 6/2009 | Madan | |
| 7,613,955 B2 | 11/2009 | Arnold | |
| 8,448,013 B2 | 5/2013 | Clark et al. | |
| 8,812,443 B2 | 8/2014 | Dewey et al. | |
| 2008/0168242 A1 * | 7/2008 | Eberbach | G06F 11/004 711/161 |
| 2008/0222456 A1 | 9/2008 | Jones | |
| 2012/0331264 A1 * | 12/2012 | Farrell | G06F 12/10 711/207 |
| 2014/0351655 A1 * | 11/2014 | Malinowski | G06F 11/0778 714/45 |

(Continued)

*Primary Examiner* — Joseph D Manoskey
(74) *Attorney, Agent, or Firm* — William K. Konrad; Konrad Raynes Davda & Victor LLP

(57) ABSTRACT

Provided are a computer program product, system, and method for dump data collection in accordance with one embodiment of the present description, in which a variable number of data dump components are selected from a set of data dump components. Each component contains a portion of an available dump data and has associated therewith a component collection time to collect the dump data associated with the component. A determination is made as to whether a total component collection time for the selection of data dump components exceeds a predetermined maximum. The dump data contained in the selection of data dump components is collected if the total component collection time for the selection of data dump components does not exceed the predetermined maximum. Other aspects of dump data collection management in accordance with the present description are described.

20 Claims, 9 Drawing Sheets

(56) References Cited

U.S. PATENT DOCUMENTS

2015/0006963 A1 1/2015 Geisert et al.
2016/0132381 A1* 5/2016 Bello .................. G06F 11/0778
                                                            714/45

* cited by examiner

DUMP DATA COLLECTION MANAGEMENT FOR A STORAGE AREA NETWORK

BACKGROUND OF THE INVENTION

1. Field of the Invention

This invention relates to systems, apparatus, and methods for recovering data and more particularly relates to systems, apparatus, and methods for collecting dump data.

2. Description of the Related Art

A data dump typically refers to a collection of available dump data which is temporarily stored in a volatile memory of a digital system (such as a storage control unit) at the time of a processing error or failure or other processing event. Dump data may be useful for diagnosing causes of an error or failure or otherwise assessing the performance of a digital system. Dump data may be directly associated with the performance of one or more hardware and/or software components of the digital system. In some systems, the dump data may include all or substantially all of the data located in volatile memory of a storage control unit at the time of the event.

The dump data of the data dump may be retrieved in a dump data collection process such as an On-Demand Data (ODD) Dump collection process which retrieves the dump data in response to a request which may be issued by a user or by exception handler selection logic, for example. To prevent loss of the dump data stored in volatile memory, normal operations such as input/output operations of the storage control unit are frequently suspended by the ODD collection process while the data of the data dump is collected.

Depending upon the size of the data dump, collection of dump data can be relatively time consuming, and therefore can have a significant impact on storage operations. For example, in a system capable of performing three million input/output operations per second, a pause for dump data collection for an interval as short as one second can delay as many as three million input/output operations. Accordingly, many systems employ a timer to limit the input/output suspension period of the dump data collection. If the timer expires before the dump data collection is completed, the resumption of normal input/output operations can lead to loss of some if not all of the data dump.

It has been proposed to prioritize the dump data collection process so as to target dump data of a higher priority before dump data of a lower priority is targeted for collection. In other systems, it has been proposed to provide logic to analyze the nature of an error or other event associated with the data dump and determine which portions of the total dump data available are to be targeted for collection. However, in these proposals, if a dump data collection timer expires before the dump data collection is completed, the resumption of normal input/output operations can lead to loss of some if not all of the dump data targeted for collection.

SUMMARY

A system of one or more computers can be configured to perform particular operations or actions by virtue of having software, firmware, hardware, or a combination of them installed on the system that in operation cause the system to perform the actions. One or more computer programs can be configured to perform particular operations or actions by virtue of including instructions that, when executed by data processing apparatus, cause the apparatus to perform the actions. One general aspect includes a method, including: receiving selection of a variable number of data dump components including at least a first data dump component from a set of data dump components of a data dump having available dump data. A selected data dump component of the set of data dump components contains a portion of the available dump data, is identified by a component identification, and has associated therewith a component collection time identifying a component collection time to collect the portion of the available dump data contained in the selected data dump component.

The method also includes determining whether a total component collection time for the selection of data dump components exceeds a predetermined maximum component collection time. The method also includes providing a request requesting dump data collection of the dump data contained in the selection of data dump components if the total component collection time for the selection of data dump components does not exceed the predetermined maximum component collection time. Other embodiments of this aspect include corresponding computer systems, apparatus, and computer programs recorded on one or more computer storage devices, each configured to perform the actions of the methods.

Implementations may include one or more of the following features. The method further including a user selecting at least one component from the set of data dump components to provide the selection of data dump components so that the total component collection time for the selection of data dump components does not exceed the predetermined maximum component collection time. The method further including exception handler selection logic selecting as a function of a detected error, at least one component from the set of data dump components to provide the selection of data dump components so that the total component collection time for the selection of data dump components does not exceed the predetermined maximum component collection time. The method further including data dump component collection logic receiving the request requesting collection of the dump data contained in the selection of data dump components, suspending input/output operations of central processing units (CPUs), identifying the dump data contained in the selection of data dump components of the request, and collecting identified dump data contained in the selection of data dump components of the request, where the total component collection time for the selection of data dump components does not exceed the predetermined maximum component collection time.

Implementations of the described techniques may include hardware, a method or process, or computer software on a computer-accessible medium. Other aspects of dump data collection management in accordance with the present description are described.

DETAILED DESCRIPTION

Figure 1:
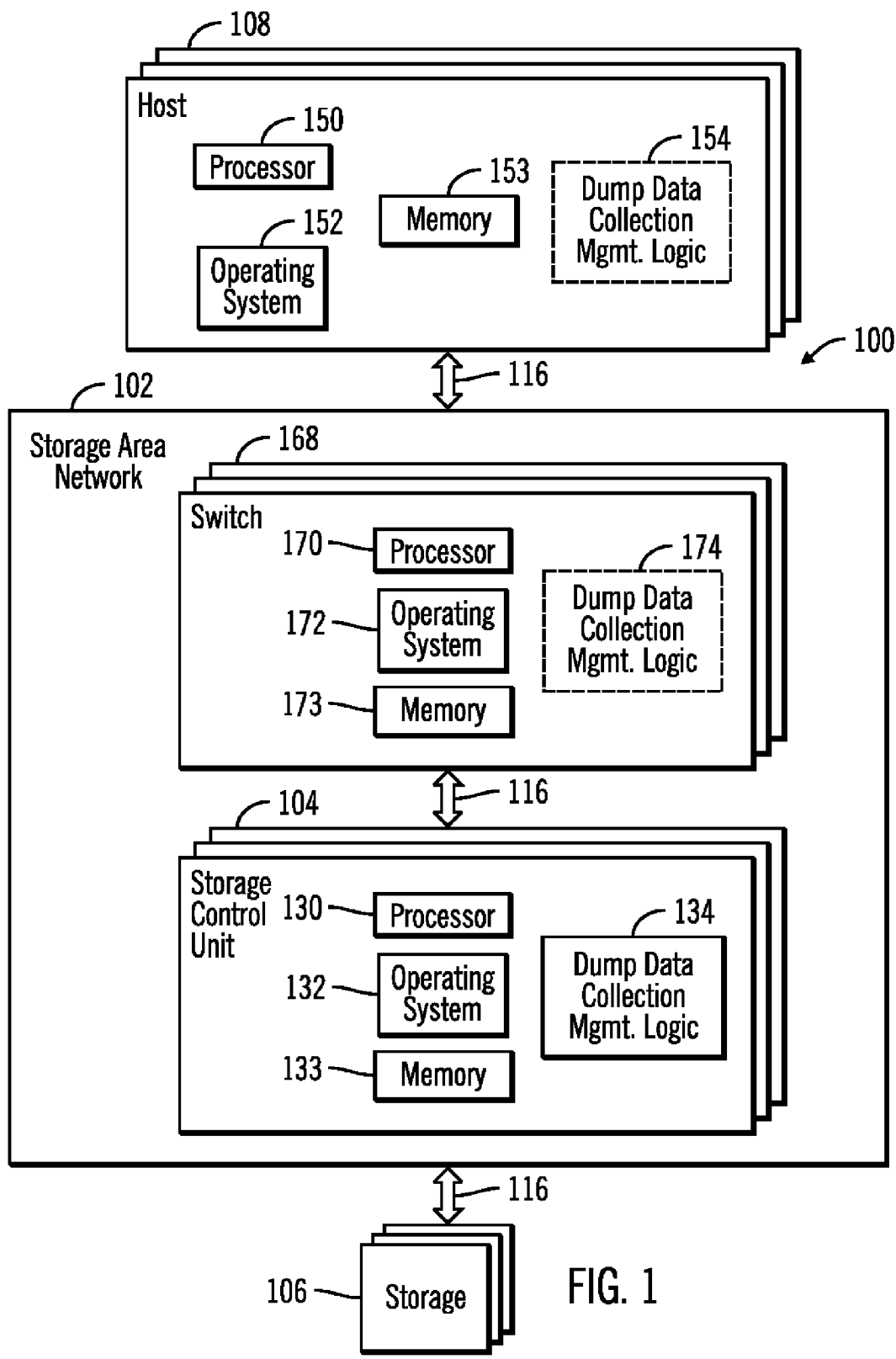
FIG. 1 illustrates an embodiment of a computer system in a storage environment, employing aspects of dump data collection management in accordance with the present description.

In one aspect of dump data collection management in accordance with the present description, focusing the collection of dump data on selected data dump components deemed to be most relevant to a particular system error or other event, and excluding the dump data of remaining, non-selected data dump components which have little or no relevance to the particular event, dump data collection time and the system resources employed for collecting the dump data may be reduced. In some applications, the reduction in dump data collection time may be as much as a ten times reduction in some applications. Thus, by enabling a dynamic interface to select dump data components, in some applications collection times can be brought down to the low double digit millisecond range as compared to prior collection times being on the order of a second in some instances. In addition, a volatile memory dump buffer space reserved for dump data collection may be smaller in size to accommodate a more compact collection of dump data of the selected data dump components, as compared to the dump buffer space which may be needed to collect the dump data of a non-focused dump data collection process.

In certain embodiments, the dump data transfer logic transfers dump data to a dump buffer space until the expiration of an interval timed by a dump data transfer timer to ensure that the CPU input/output operations requested by a host are not paused for an undesirably long period of time. However, as discussed herein, in one aspect of the present description, component selection logic may utilize an expected collection time for selection of a data dump component to ensure that the actual total component collection time for selected components does not exceed a predetermined maximum component collection time. Accordingly, the predetermined maximum component collection time may be set to not exceed the interval to be timed by a dump data transfer timer.

In another aspect of the present description, by reducing the actual time expended in dump data collection, the success rate of the dump data collection may be increased. As a result, the likelihood of successfully collecting the appropriate dump data on the first attempt before the expiration of the dump data transfer timer, may increase as well. Thus appropriate dump data may be captured at the first requested instant, in many applications.

Many of the functional elements described in this specification have been labeled as "logic," in order to more particularly emphasize their implementation independence. For example, a logic element may be implemented as a hardware circuit comprising custom very large scale integration (VLSI) circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

As used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

FIG. 1 illustrates an embodiment of a computing environment employing dump data collection management in accordance with the present description. In one embodiment, the computing environment includes a computer system 100 which in turn includes a storage area network 102 having one or more storage controllers or storage control units, such as a storage control unit 104, which is configured to control one or more storage devices such as a storage 106. For example, a storage control unit 104 manages access to data stored in a storage 106, by one or more hosts as represented by a host 108 (FIG. 1A). The storage area network provides data paths for input/output data transfer operations between the hosts 108 and the storage control units 104 of the storage area network 102.

In one embodiment, each storage control unit 104 may represent a cluster of processing nodes including a storage control unit for a storage similar to the storage 106 (FIG. 1A), and another storage control unit for additional storage similar to the storage 106 (FIG. 1A). Data may be stored in the form of files in storage volumes of the storage 106, which may be in a peer-to-peer mirror relationship such that data written to one storage volume, typically a primary storage volume in a storage 106 is mirrored to a corresponding secondary storage volume in other storage often located in a different geographical location, such that the secondary storage volume is a copy of the primary storage volume. The source of the data written to the storage volumes is typically one or more of the hosts 108. Thus, the hosts 108 issue input/output requests over the storage area network 102 to a storage control unit 104 requesting the storage control unit 104 to read data from or write data to the storage volumes of the storage 106 controlled by the storage control unit 104. It is appreciated that dump data collection in accordance with the present description is applicable to other data processing environments in addition to storage environments having storage volumes in a mirrored, peer-to-peer relationship.

The components depicted in FIG. 1 are interconnected by data paths 116. The data paths 116 each may comprise one or more networks, such as a Local Area Network (LAN), Storage Area Network (SAN), Wide Area Network (WAN), peer-to-peer network, wireless network, etc. Alternatively, the data paths 116 may comprise bus interfaces, such as a Peripheral Component Interconnect (PCI) bus or serial interface. The communication links of the data paths may utilize various communication protocols and various transmission media such as wire cables, fiber optic cables, wireless channels, etc.

The storage 106 (FIG. 1A) may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The computing environment of FIG. 1 includes various processing nodes within the hosts 108 and the storage area network 102. Aspects of dump data collection management in accordance with the present description for the storage area network 102 may be implemented in one or more of such processing nodes. For example, each storage control unit 104 includes one or more processors 130, an operating system 132, a memory 133 and may include various software applications. The operating system 132 may comprise the International Business Machines (IBM) z/OS® operating system or other operating systems for managing storage devices in a storage area network. In one embodiment, a storage control unit 104 may optionally include dump data collection management logic 134 to manage aspects of dump data collection in the system 100 in accordance with the present description. The dump data collection management logic 134 may be implemented with hardware, software, firmware or any combination thereof. Thus dump data collection management logic 134 may be separate from the operating system 132 or may be included within the operating system 132, for example.

Similarly, each host 108 includes one or more processors 150 (FIG. 1), an operating system 152, a memory 153 and various software applications. The operating system 152 may comprise the IBM z/OS® operating system or other operating systems for managing input/output operations through a storage area network. (IBM and z/OS are trademarks of IBM worldwide). Dump data collection management logic 154 of a host 108 manages aspects of dump data collection management in accordance with the present description, and may be implemented with hardware, software, firmware or any combination thereof. Thus dump data collection management logic 154 may be provided in addition to or instead of the dump data collection management logic 134 of a storage control unit 104, and may be separate from the operating system 152 or may be included within the operating system 152, for example.

The storage area network 102 may further comprise a plurality of switches 168 which are configured to switch data paths within the storage area network to provide for data transfers from a selected host 108 to a selected storage control unit 104. In this embodiment, each switch 168 includes one or more processors 170, an operating system 172, a memory 173 and may include various software applications. The operating system 172 may comprise an appropriate switch operating system or other operating systems for managing data paths in a storage area network. In one embodiment, a switch 168 may optionally include dump data collection management logic 174 in addition to or instead of the dump data collection management logic 154 of a host 108 or the dump data collection management logic 134 of a storage control unit 104, to manage aspects of dump data collection in accordance with the present description. The dump data collection management logic 174 may be implemented with hardware, software, firmware or any combination thereof. Thus dump data collection management logic 174 may be separate from the operating system 172 or may be included within the operating system 172, for example.

In one embodiment, the topology of the data path 116 depicted in FIG. 1 between the host 108 and the storage control unit 104 includes a particular protocol such as the Fibre Connection (FICON) communication protocol often used with fiber optic components. Although described in one embodiment in connection with fiber channel links and the Fibre Connection (FICON) communication protocol, it is appreciated that dump data collection management for a storage area network in accordance with the present description may be applied to other types of communication links and protocols. For example, dump data collection management in accordance with the present description may be utilized for components complying with the Extended Link Services (ELS) protocol.

Figure 2A:
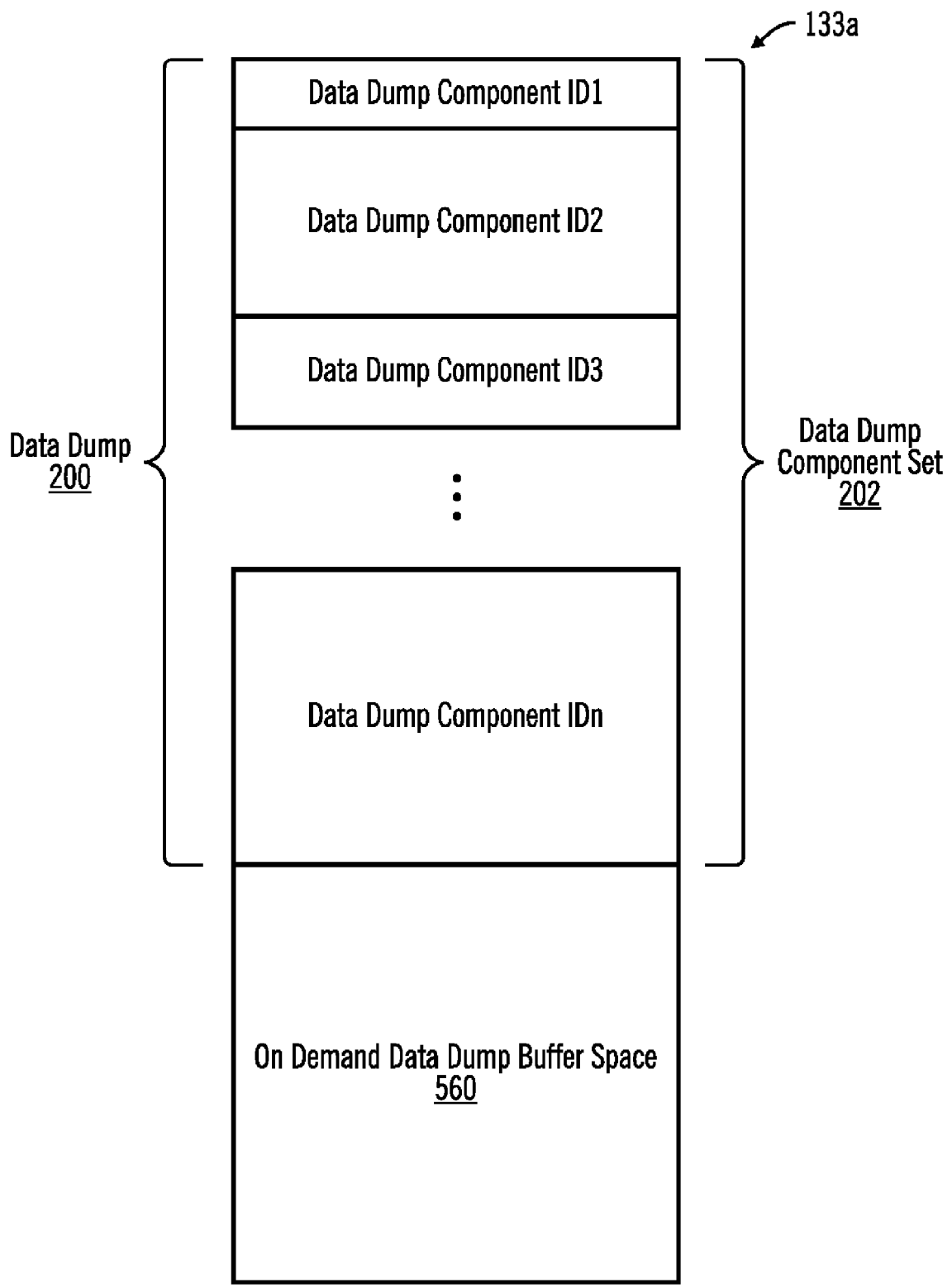
FIG. 2A illustrates an embodiment of a set of data dump components employing aspects of dump data collection management in accordance with the present description.

FIG. 2A shows a portion 133a of a volatile memory of the memory 133 of a storage control unit 104 temporarily storing a data dump 200 of available dump data created in response to an error condition or other system event, and made available for collection. As previously mentioned, in one embodiment of dump data collection management in accordance with the present description, a data dump 200 available for collection is subdivided into a set 202 of data dump components, as represented by the data dump components ID1, ID2 . . . IDn, each of which includes a portion of the dump data of the available data dump 200.

In certain embodiments, the dump data which has been subdivided into a set of data dump components, may include any or all of the data located in volatile memory of the storage control unit 104 at the time of the ODD dump request. Specific examples of data dump components may include one or more of a general system data dump component containing general system dump data, a message queue data dump component containing message queue dump data, a trace buffer data dump component containing trace buffer dump data, a task control block data dump component containing task control block dump data, and an individual software subcomponent data dump component containing individual software subcomponent dump data.

Thus, the amount of dump data contained within each data dump components ID1, ID2 . . . IDn may vary from component to component. Moreover, the specific dump data contained within each dump data component may be unique to the particular component or may be present in more than one data dump component. Although depicted as residing in contiguous blocks of the volatile memory 133a, it is appreciated that the dump data contained within a particular data dump component may be distributed over a number of different non-contiguous memory areas of the volatile memory 133a.

The data dump components ID1, ID2 . . . IDn, of the set 202 may be represented by a data structure such as the data structure 204 shown in FIG. 2B. The data structure 204 may be generated by component selection logic 210 either in advance of a detected error or other system event, or upon the occurrence of a detected error or other system event.

Each data dump component ID1, ID2 . . . IDn, is identified in an entry 206a, 206b, 206c, 206d, 206e, 206f . . . 206n, respectively, of the data structure 204 by a suitable data dump component identification in an ID field 204a. In addition, in this embodiment, the memory locations where the dump data contained with each component may be found, are identified in a component location field 204b of the data structure 204. The memory locations may be provided in a suitable format such as physical addresses, logical addresses or address metadata by which addresses may be calculated or otherwise identified. Further, an expected data dump component collection time T1, T2 . . . Tn, to collect the dump data of the associated data dump component ID1, ID2 . . . IDn, respectively, is identified in a collection time field 204c of the data structure 204 for each data dump component ID1, ID2 . . . IDn, of the set 202. The expected data dump component collection time T1, T2, . . . Tn, which may be expressed in terms of milliseconds, for example, for each data dump component ID1, ID2, . . . IDn, may be determined by suitable techniques such as system analysis or test runs or a combination thereof, depending upon the particular application.

Figure 2B:
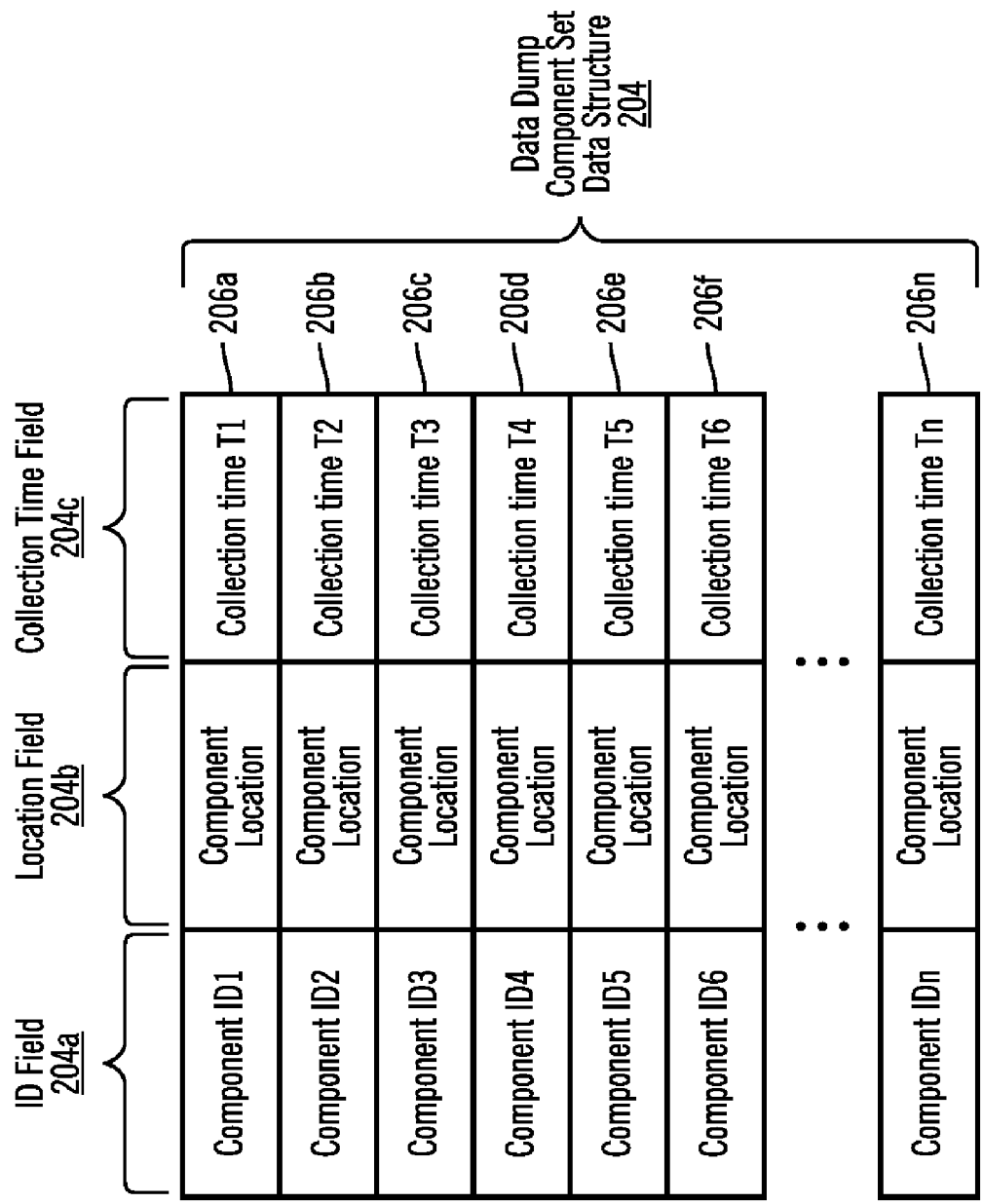
FIG. 2B illustrates an embodiment of a data structure representing the set of data dump components of FIG. 2A.
Figure 2C:
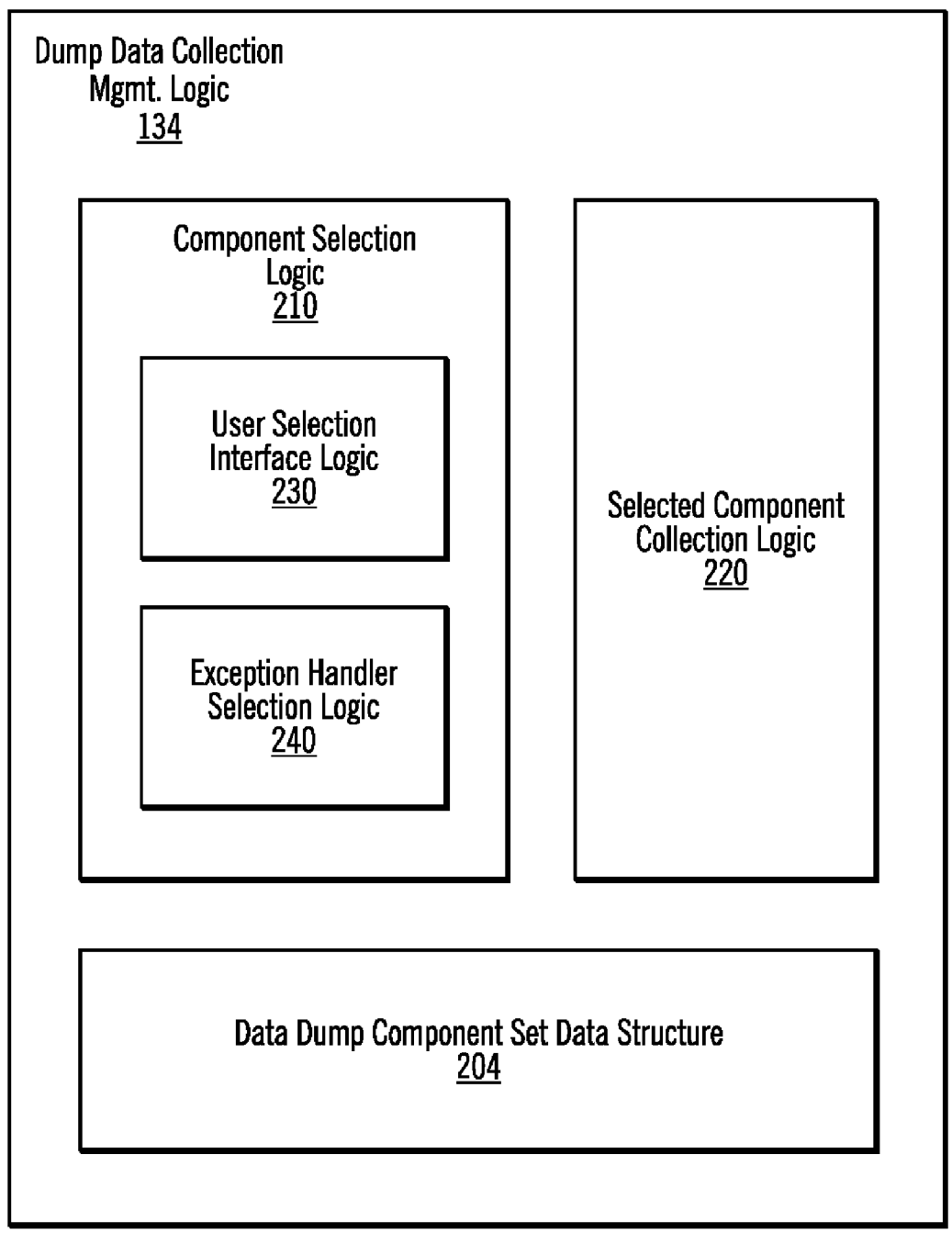
FIG. 2C illustrates an embodiment of dump data collection management logic employing aspects of dump data collection in accordance with the present description.

FIG. 2C shows one embodiment of a dump data collection management logic such as the logic 134 of a storage control unit 104, for example. The dump data collection management logic 134 includes a data dump component set data structure such as the data structure 204 described above, a component selection logic 210 which generates a request such as an On Demand Data (ODD) dump request, to collect selected dump data, and a component collection logic 220 which collects selected dump data in response to a data dump request. The component selection logic 210 is configured for selection of a variable number of data dump components and is further configured to ensure that the expected total component collection time for selected components does not exceed a predetermined maximum component collection time. In one embodiment, the component selection logic 210 utilizes the expected component collection time for each selected data dump component to ensure that the actual total component collection time for selected components does not exceed the predetermined maximum component collection time.

As explained in greater detail below, the component collection logic 220 is configured to receive a request to collect dump data of selected components, suspend input/output operations of central processing units (CPUs), identify the dump data of the selected components of the request, and collect the identified dump data of selected components of the request. As a result, the total component collection time for selected components likely will not exceed the predetermined maximum component collection time.

The request to collect dump data of selected data dump components may originate from a variety of sources such as a user/operator, the host 108, a companion storage control unit 104, or it may be triggered by selected internal circumstances detected by the storage control unit 104. Accordingly, component selection logic 210 in accordance with the present description may be employed by one or more of a host 108, a storage control unit 104 or other devices, to generate the data dump request.

In one embodiment, the component selection logic 210 includes at least one of user selection interface logic 230 and exception handler selection logic 240 as shown in FIG. 2C. As explained in greater detail below, the exception handler selection logic 240 is configured to detect an error or other system event and dynamically select particular data dump components as a function of the nature of the particular error or other system event associated with the generation of dump data. Thus, the selection of particular data dump components may be triggered by selected internal circumstances detected by the exception handler selection logic 240. Although described in connection with exception handler selection logic, it is appreciated that other programmed selection logic may be utilized to dynamically select data dump components as described herein.

Figure 3:
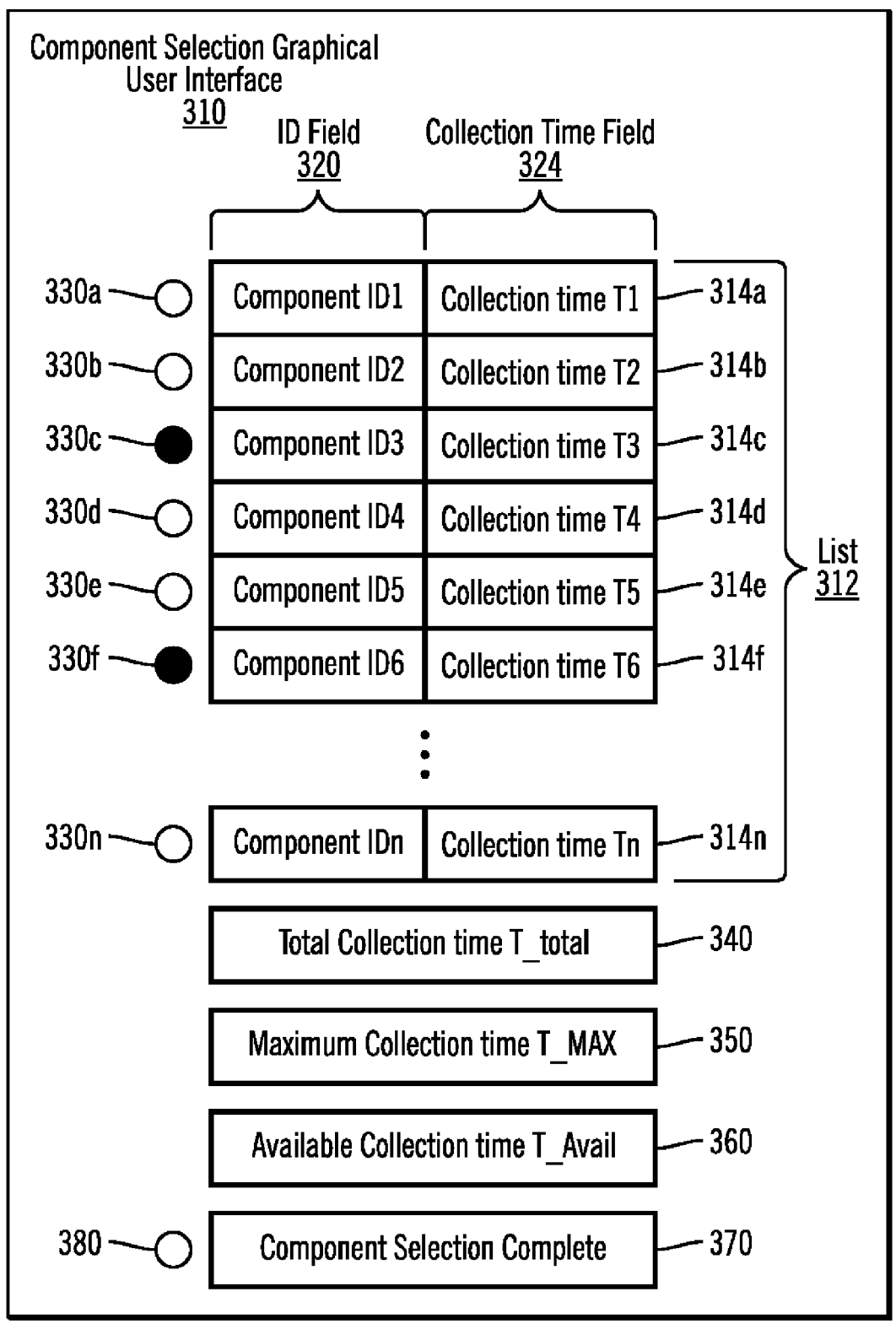
FIG. 3 illustrates an embodiment of a graphical user interface of a user selection interface logic of the component selection logic of FIG. 2C.
Figure 7:
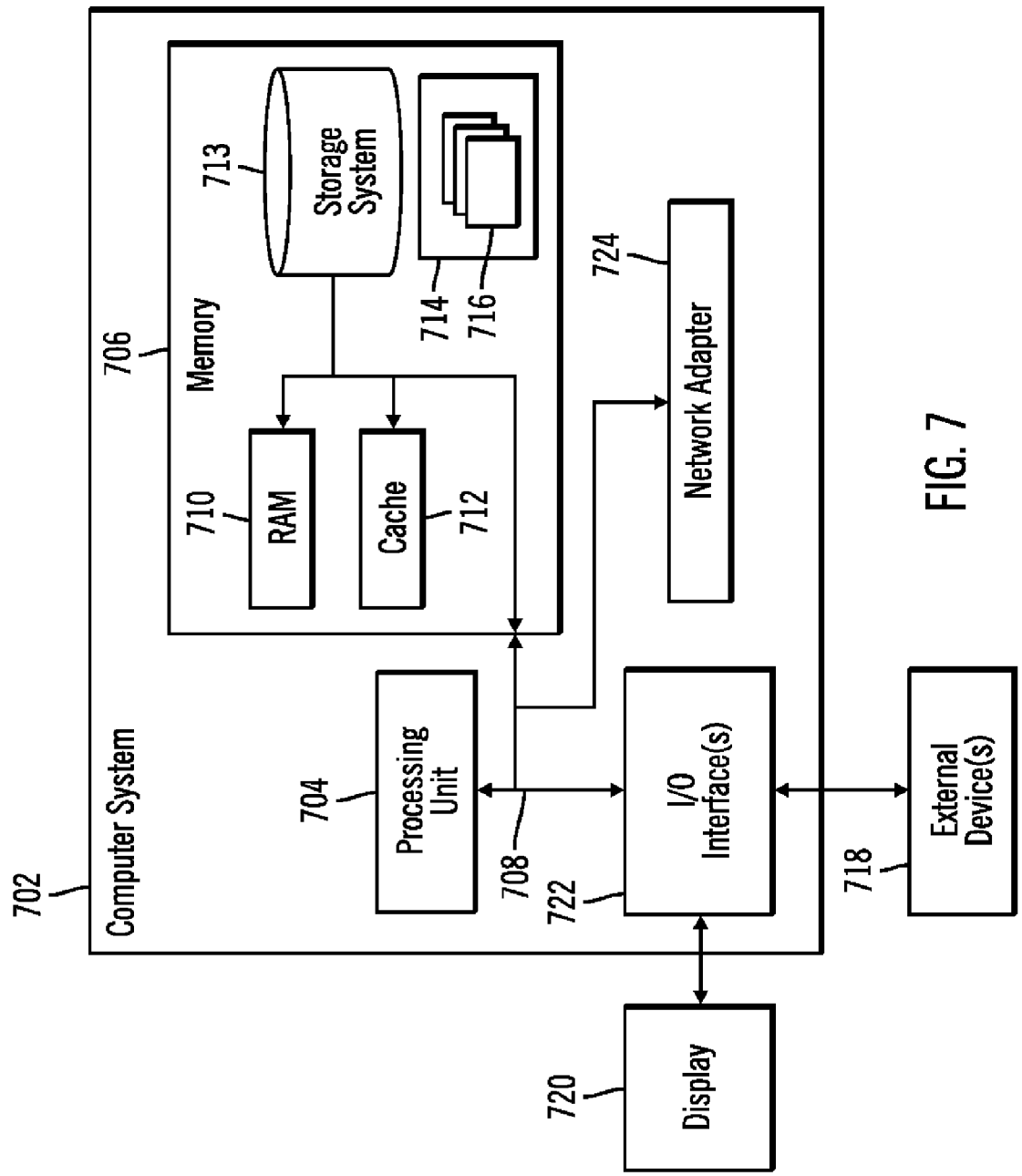
FIG. 7 illustrates an embodiment of a computing environment in which logic components of the figures may be implemented.

FIG. 3 shows an example of a graphical user interface 310 of a user selection interface logic 230 which is configured to receive from a user, a selection of a variable number of data dump components from a set of data dump components graphically represented as a list 312 of data dump component entries 314a, 314b, . . . 314n, each entry representing a particular data dump component identified by a component identification (ID) displayed in an ID field 320 of each entry. The list 312 may be based upon a suitable data structure defining the available data dump components, such as the data structure 204 (FIG. 2B). The graphical user interface 310 may be displayed on a suitable monitor or display such as the display 720 (FIG. 7).

Thus, in this embodiment as previously described, the total data dump available for collection is subdivided into a set of data dump components ID1, ID2, . . . IDn, each of which includes a portion of the available data dump. Each data dump component ID1, ID2, . . . IDn displayed in an ID field 320 of each entry, has associated with it an expected data dump component collection time T1, T2, . . . Tn, respectively, which is displayed in an expected component collection time field 324 of the list 312 of data dump component entries 314a, 314b, . . . 314n, respectively. Each data dump component collection time T1, T2, . . . Tn, which may be expressed in terms of milliseconds, for example, represents the amount of time expected to be utilized by the system to collect the dump data of the particular data dump component ID1, ID2, . . . IDn. Thus, the data dump component collection time T1, for example, represents the amount of time expected to be utilized by the system to collect the dump data of the particular data dump component ID1, for example.

Figure 4:
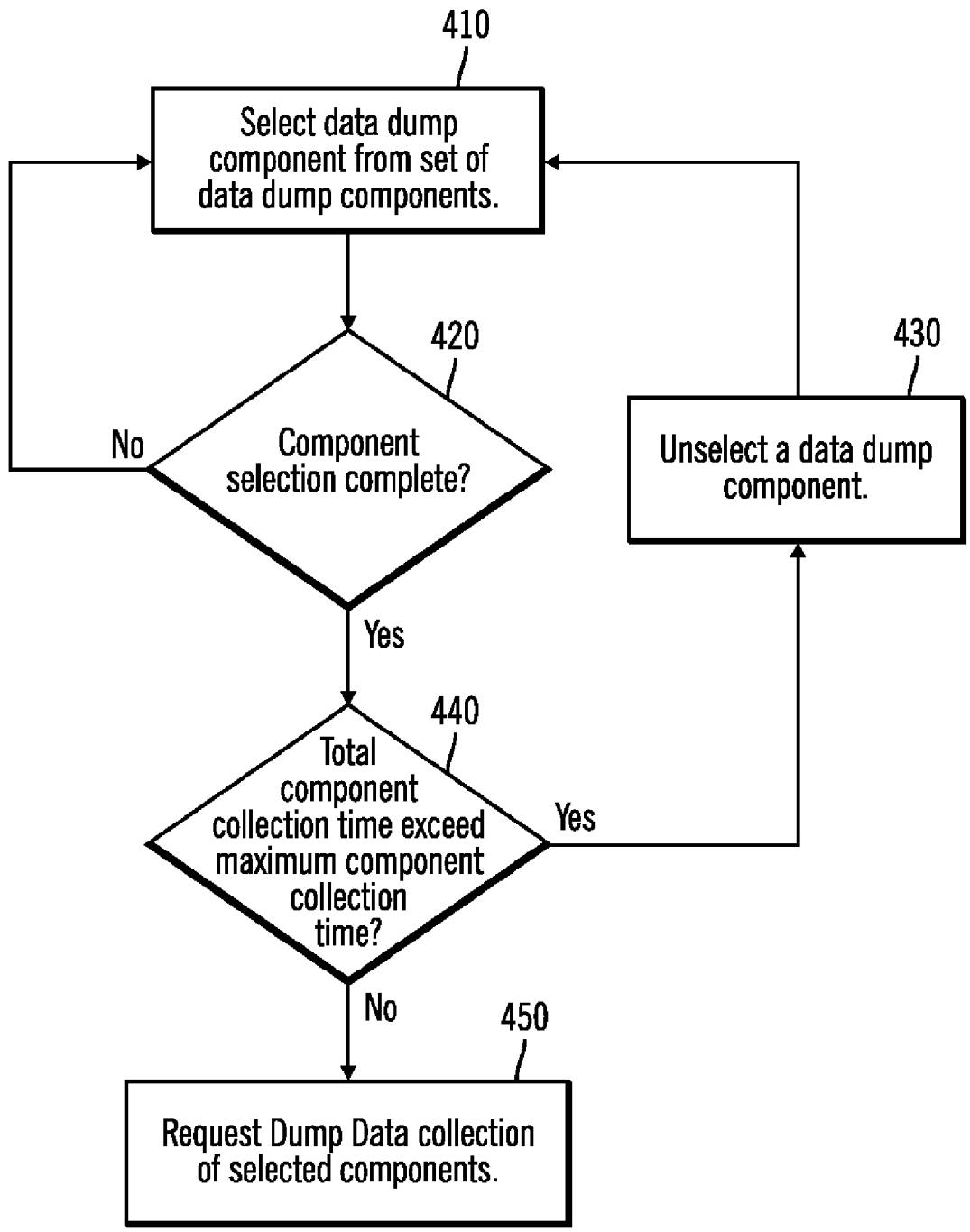
FIG. 4 illustrates an embodiment of operations of a component selection logic of the dump data collection logic of FIG. 2C.

FIG. 4 depicts one example of operations of the data dump component selection logic 210. The operations of FIG. 4 are representative of operations of the data dump component selection logic 210 in connection with one or both of the user selection interface logic 230, the exception handler selection logic 240 or another requesting agent of the component selection logic 210. In a first operation, a requesting agent such as a user or exception handler selection logic selects (block 410) a data dump component from the set of available data dump components ID1, ID2, . . . IDn. In an example utilizing the user selection interface logic 230 of FIG. 2C, a user may select a particular data dump component by clicking on a suitable user selection input element such as one of the radio buttons 330*a*, 330*b*, . . . 330*n* adjacent an associated data dump component entry 314*a*, 314*b*, . . . 314*n*, of the list 312. Thus, in the example of FIG. 3, a user has selected the entry 314*c* as indicated by the darkened adjacent radio button 330*c*. In selecting the data dump component ID3, the user may consider the nature of the error or other event giving rise to the data dump. Thus, the user can dynamically make a judgement that collection of dump data should be focused upon the data dump component ID3 and dynamically make any other appropriate data dump component selections which are deemed by the user to be more relevant to the particular event than other candidate data dump components.

Alternatively, exception handler selection logic 240 may be configured to automatically and dynamically select a data dump component such as the data dump component ID3 of entry 314*c* as a function of the nature of the detected error or other event giving rise to the data dump. It is appreciated that the manner in which a user, exception handler selection logic 240 or other requesting agent may select and input a data dump component selection may vary, depending upon the particular application.

In one embodiment of the user selection interface logic 230 of FIG. 2C, an expected total selected component collection time T_total is displayed in a total component collection time field 340 of the graphical user interface 310. The expected total component collection time T_total may be generated by the data dump component selection logic 210 by accumulating a sum of the expected data dump component collection times T1, T2, . . . Tn, for the selected data dump components ID1, ID2, . . . IDn, as the data dump components are selected (block 410). Thus, if a single data dump component ID3 of entry 314*c* has been selected, the total component collection time T_total will be displayed in the field 340 as equal to the expected collection time represented by the collection time T3 of the entry 314*c*. In another example, Thus, if both the data dump components ID3 of entry 314*c* and ID6 of the entry 314*f* have been selected as indicated by the darkened radio buttons 330*c* and 330*f*, respectively as shown in FIG. 3, the total component collection time T_total will be displayed in the field 340 as equal to the expected collection time represented by the sum of the component collection times T3 plus T6 of the entries 314*c* and 314*f*, respectively.

The requesting agent may select (block 410) one or more data dump components for collection from the set of data dump components available for collection. In one embodiment, the interface 310 provided by the user selection interface logic 230 of FIG. 2C, displays a maximum allowed total component collection time T_MAX in a maximum total component collection time field 350 of the graphical user interface 310. The maximum allowed collection time may be set using a variety of techniques. For example, the system or user may set a default value to provide a predetermined maximum value. In some embodiments, the default value may be altered by the user or the system as conditions vary. One example of a suitable maximum allowed collection time is 90 milliseconds, for example. It is appreciated that other maximum collections times may be selected depending upon the particular application. However, it is expected that in many applications, a maximum collection time well under one second, such as within a range of 50-150 milliseconds, or 25-500 milliseconds, may be applicable.

As the user selects additional data dump components, the user selection interface logic 230 can update the field 340 to indicate to the user the total expected collection time T_total for all the data dump components selected by the user. Thus, as the user selects additional data dump components, the user can compare the updated total expected collection time T_total for all the data dump components selected by the user, to the maximum allowed total component collection time T_MAX in the maximum total component collection time field 350 of the graphical user interface 310, to ensure that the expected collection time T_total for all the data dump components selected by the user, does not exceed the maximum allowed collection time T_MAX displayed in the field 340.

In one embodiment, an available collection time T_Avail equal to the maximum allowed total component collection time T_MAX, less the expected total component collection time T_total of the selected data dump components, may also be displayed in a field 360 of the interface 310. Thus, in this example, if a single data dump component ID3 of entry 314*c* has been selected, the available collection time T_Avail equals the maximum component collection time T_MAX minus expected component collection time T3 for the selected data dump component ID3, and is displayed in the field 360 of the interface 310. Similarly, if both the data dump components ID3 of entry 314*c* and ID6 of the entry 314*f* have been selected as indicated by the darkened radio buttons 330*c* and 330*f*, respectively as shown in FIG. 3, the available collection time T_Avail equals the maximum component collection time T_MAX minus the sum of the expected component collection times T3 and T6 for the selected data dump components ID3 and ID6, respectively.

Accordingly, the available collection time T_Avail indicates to the user the remaining collection time available should the user consider selecting additional data dump components. If additional data dump components are to be selected, the user may compare the expected component collection time T1, T2 Tn of the component collection time field 324 of the list 312, to the available collection time T_Avail, to determine if a particular data dump component may also be selected without exceeding the maximum component collection time T_MAX.

A determination (block 420) may be made by the data dump component selection logic 210 as to whether the selection of data dump components by the requesting agent is complete. In an embodiment in which data dump component selection is being made by a user using the graphical user interface 310 (FIG. 3) provided by the user selection interface logic 230 (FIG. 2C), the user can provide an indication that the data dump component selection is complete by clicking on a radio button 380 (FIG. 3) adjacent a label 370 containing indicia displaying suitable text such as "Component Selection Complete." It is appreciated that a suitable selection completion indication of completion of component selection by the requesting agent may be provided in a variety of formats, depending upon the particular application. If the data dump selection process by the requesting agent is not complete, the requesting agent can continue to select (block 410) additional data dump components as described above.

A determination (block 440) may be made by the data dump component selection logic 210 as to whether the expected total collection time for all the selected data dump components exceeds a maximum collection time. In an embodiment in which data dump component selection is being made by a user using the graphical user interface 310 (FIG. 3) provided by the user selection interface logic 230 (FIG. 2C), such a determination may be made by the component selection logic 210 automatically comparing the maximum allowed component collection time T_MAX displayed in the maximum component collection time field 350 to the expected total collection time T_total displayed in the total component collection time field 340 of the graphical user interface 310. A determination 420 as to whether the expected total component collection time T_total for all the selected data dump components has exceeded the maximum permitted collection time, may be indicated by the available collection time T_Avail displayed in the field 360 being a negative value, indicating that the maximum component collection time T_MAX has been exceeded. Alternatively such a determination may be made manually by the user inspecting the fields of the user interface 310 as described above.

If the expected total component collection time T_total for all the selected data dump components has exceeded the maximum permitted component collection time, one of the previously selected data dump components may be unselected 430. For example, in the interface 310 of the user selection interface logic 230, the user can click on a darkened radio button 330a, 330b . . . 330n of a selected data dump component which unselects that component and returns the radio button to an unselected state as represented by the light filled button 330d, for example. The fields of the interface are updated accordingly upon de-selection or unselection of a component.

In an example in which the data dump component selection is being performed by exception handler selection logic 240, a selection may be "unselected" by the exception handler selection logic 240 if the expected total component collection time T_total for all the selected data dump components has exceeded the maximum permitted component collection time. Alternatively, the exception handler selection logic 240 may be configured to stop selecting additional data dump components should selection of an additional data dump component cause the expected total component collection time for all the selected data dump components to exceed the maximum permitted component collection time. Similarly, in one embodiment, the component selection logic 210 may reject, that is, not accept selection of a data dump component by a user or by an exception handler selection logic 240 if acceptance of that selection would cause the expected total component collection time for all the selected data dump components to exceed the maximum permitted component collection time.

Figure 5:
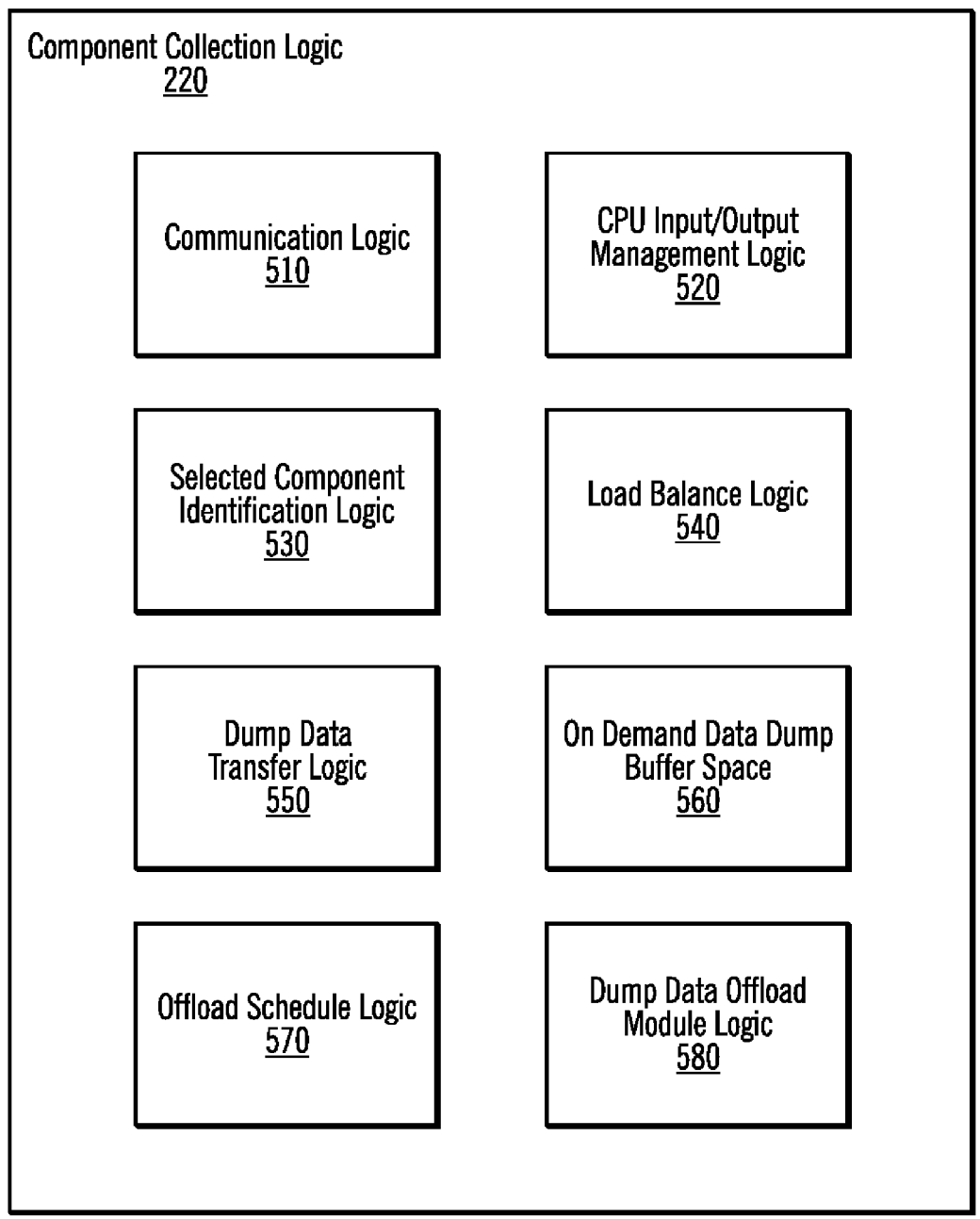
FIG. 5 illustrates an embodiment of a selected component collection logic of the dump data collection logic of FIG. 2C.
Figure 6:
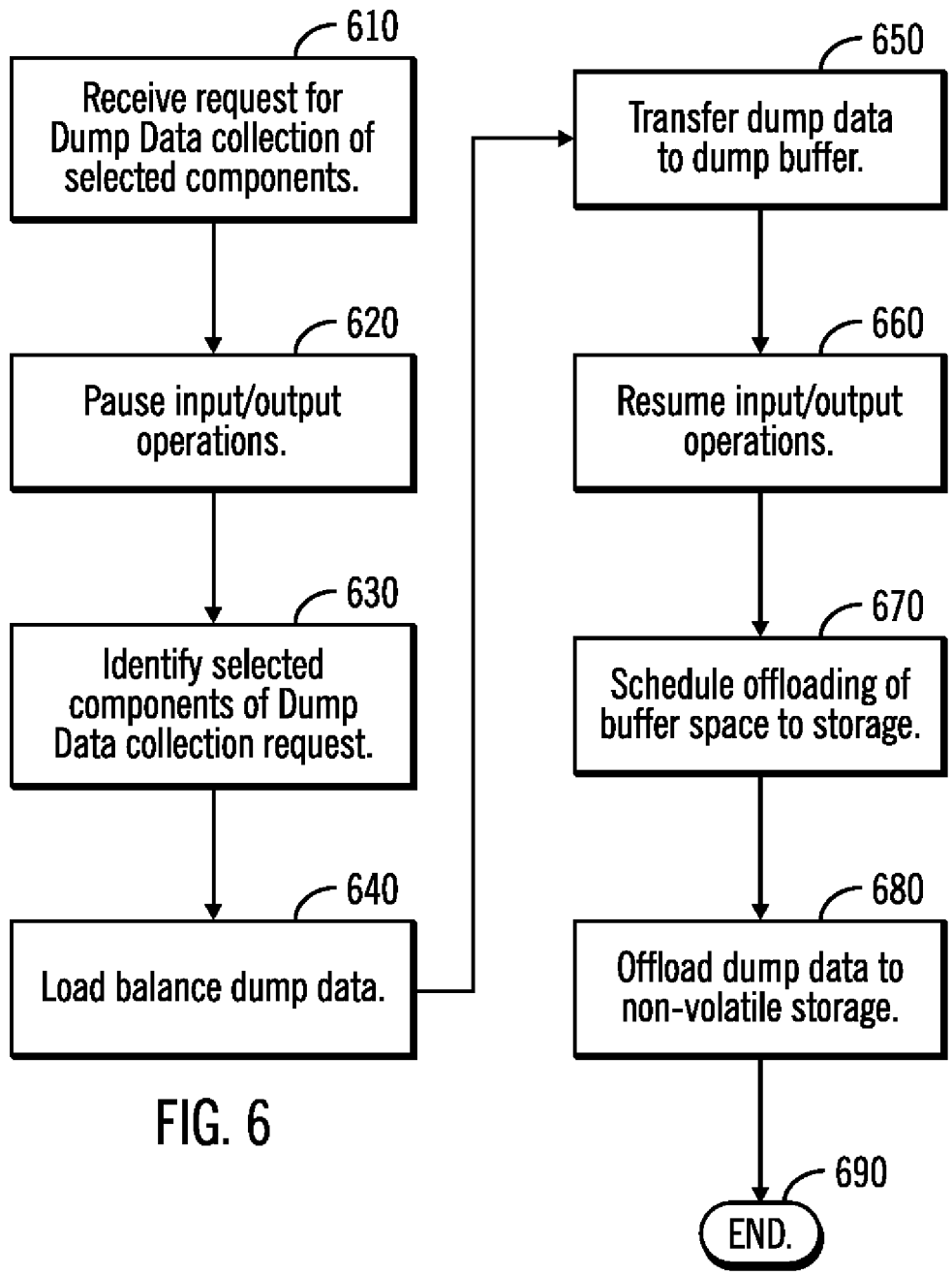
FIG. 6 illustrates an embodiment of operations of the selected component collection logic of the dump data collection logic of FIG. 2C.

Once the selection (block 410) of data dump components is complete (block 420) and it is determined (block 440) that the expected total component collection time for all the selected data dump components does not exceed the maximum permitted component collection time, collection of the dump data of the selected data dump components is requested (block 450). FIG. 5 is a schematic block diagram of one embodiment of a data dump component collection logic 220 of a storage control unit 104 in accordance with one aspect of the present description. The depicted component collection logic 220 includes a communication logic 510, a central processing unit (CPU) input/output management logic 520, a selected data dump component identification logic 530, a load balance logic 540, a dump data transfer logic 550, and on demand data (ODD) dump buffer space 560, an offload schedule logic 570, and a dump data offload logic 580. An example of operations of the component collection logic 220 of FIG. 5 is depicted in FIG. 6.

In certain embodiments, the communication logic 510 receives (block 610, FIG. 6) a request to collect dump data, such as an ODD dump request, which may originate from a component selection logic 210 of a variety of sources such as a host 108, or a storage control unit 104, for example. In response to the ODD dump request, the CPU input/output management logic 520 may pause (block 620, FIG. 6) any input/output operations (also referred to as "scan loops) requested by a host 108 and operating within the storage control unit, to preserve the integrity of the dump data. In this manner, by pausing the input/output operations, alteration of the dump data of the selected data dump components located in volatile memory before it is safely collected, may be avoided. In certain embodiments, the dump data which has been subdivided into a set of data dump components, may include any or all of the data located in volatile memory of the storage control unit 104 at the time of the ODD dump request.

In one aspect of the present description, the data dump component identification logic 530 identifies (block 630, FIG. 6) on the basis of the received ODD dump request, which data dump components of the set of data dump components have been selected by the requesting component selection logic 210, and the dump data to be collected for the identified data dump components. The load balance logic 540 may balance (block 640, FIG. 6) the dump data of the identified selected data dump components to be collected and transferred to the dump buffer space 560 amongst multiple processing threads to maximize an efficient transfer of dump data to the dump buffer space 560. The dump data transfer logic 550 may transfer (block 650, FIG. 6) the dump data of the identified selected data dump components being collected to the dump buffer space 560. The dump buffer space 560 may include a selected volume of volatile memory for temporarily storing dump data.

In one aspect of the present description, by focusing dump data collection on data dump components deemed to be most relevant to the particular event, and excluding the remaining, non-selected data dump components which have little or no relevance to the particular event, the time expended for collection of the selected data dump components, and the system resources employed for collecting the dump data may be reduced. In some applications, the reduction in dump data collection time may be as much as a ten times reduction in some applications. In addition, the volatile memory dump buffer space 560 reserved for dump data collection may be smaller in size to accommodate a more compact collection of dump data of the selected data dump components, as compared to the dump buffer space which may be needed to collect the buffer data of a non-focused dump data collection process.

In certain embodiments, the dump data transfer logic 550 transfers (block 650, FIG. 6) dump data to the dump buffer space 560 until the expiration of an interval timed by a dump data transfer timer to ensure that the CPU input/output operations requested by a host are not paused for an undesirably long period of time. However, as discussed above, in one aspect of the present description, the component selection logic 210 utilizes the expected collection time for each selected data dump component to ensure that the actual total component collection time for selected components does not exceed a predetermined maximum component collection time. Accordingly, the predetermined maximum component collection time may be set to not exceed the interval to be timed by a dump data transfer timer.

In addition, by reducing the actual time expended in dump data collection, the success rate of the dump data collection may be increased. As a result, the likelihood of successfully collecting the appropriate dump data on the first attempt before the expiration of the dump data transfer timer, may increase as well. Thus appropriate dump data may be captured at the first requested instant, in many applications.

The CPU input/output management logic 520 may unpause and/or restart the host requested CPU input/output operations to enable the host requested CPU input/output operations to resume (block 660, FIG. 6) normal operations because the dump data of the selected dump data components has been transferred to the dump buffer space 560. The offload schedule logic 570 may schedule (block 670, FIG. 6) the transfer (block 680) of the dump data to non-volatile storage with minimal burden to the performance of the storage control unit 104. The transfer (block 680) of the dump data to non-volatile storage completes (block 690) the dump data collection for the selected data dump components.

The computational components of the figures including the host and the storage controller, for example, may each be implemented in one or more data processing apparatus, computer systems or servers, such as the computer system 702 shown in FIG. 7. Computer system 702 may be described in the general context of computer system executable instructions, such as program modules, being executed by a computer system. Generally, program modules may include routines, programs, objects, components, logic, data structures, and so on that perform particular tasks or implement particular abstract data types. Computer system 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system 702 is shown in the form of a general-purpose computing device. The components of computer system 702 may include, but are not limited to, one or more processing units or processors 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 702 typically includes a variety of computer system readable media. Such media may be any available media that is accessible by computer system 702, and it includes both volatile and non-volatile media, removable and non-removable media.

System memory 706 can include computer system readable media in the form of volatile memory, such as random access memory (RAM) 710 and/or cache memory 712. Computer system 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disk, read only memory (CD-ROM), digital versatile disc, read-only memory (DVD-ROM) or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the present description. For example, the computer program product may comprise a computer readable storage medium having program instructions embodied therewith, the program instructions executable by a processor 704 to cause processor operations of processes and logic elements described herein.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments as described herein. The systems of FIGS. 1A, 1B, 2 may be implemented in one or more computer systems 702, where if they are implemented in multiple computer systems 702, then the computer systems may communicate over a network.

Computer system 702 may also communicate with one or more external devices 718 such as a keyboard, a pointing device, a display 720, etc.; one or more devices that enable a user to interact with computer system 702; and/or any devices (e.g., network card, modem, etc.) that enable computer system 702 to communicate with one or more other computing devices. Such communication can occur via Input/Output (I/O) interfaces 722. Still yet, computer system 702 can communicate with one or more networks such as a local area network (LAN), a general wide area network (WAN), and/or a public network (e.g., the Internet) via network adapter 724. As depicted, network adapter 724 communicates with the other components of computer system 702 via bus 708. It should be understood that although not shown, other hardware and/or software components could be used in conjunction with computer system 702. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present description(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present description.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present description need not include the device itself.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM), Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   dump data collection management logic receiving selection of a variable number of data dump components including at least a first data dump component from a set of data dump components of a data dump having available dump data, wherein a selected data dump component of the set of data dump components contains a portion of the available dump data, is identified by a component identification, and has associated therewith a component collection time identifying a component collection time to collect the portion of the available dump data contained in the selected data dump component;
   dump data collection management logic determining whether a total component collection time for the selection of data dump components exceeds a predetermined maximum component collection time; and
   dump data collection management logic providing a request requesting dump data collection of the dump data contained in the selection of data dump components if the total component collection time for the selection of data dump components does not exceed the predetermined maximum component collection time.

2. The method of claim 1, further comprising:
   dump data collection management logic receiving a selection completion indication of completion of component selection; and
   wherein the dump data collection management logic determining whether the total component collection time for the selection of data dump components exceeds the predetermined maximum component collection time, is in response to a selection completion indication.

3. The method of claim 1 further comprising a user selecting at least one component from the set of data dump components to provide the selection of data dump components so that the total component collection time for the selection of data dump components does not exceed the predetermined maximum component collection time.

4. The method of claim 1 further comprising exception handler selection logic selecting as a function of a detected error, at least one component from the set of data dump components to provide the selection of data dump components so that the total component collection time for the selection of data dump components does not exceed the predetermined maximum component collection time.

5. The method of claim 1 further comprising data dump component collection logic receiving the request requesting collection of the dump data contained in the selection of data dump components, suspending input/output operations of central processing units (CPUs), identifying the dump data contained in the selection of data dump components of the request, and collecting identified dump data contained in the selection of data dump components of the request, wherein the total component collection time for the selection of data dump components does not exceed the predetermined maximum component collection time.

6. The method of claim 1 wherein the set of data dump components includes at least one of a general system data dump component containing general system dump data, a message queue data dump component containing message queue dump data, a trace buffer data dump component containing trace buffer dump data, a task control block data dump component containing task control block dump data, and an individual software subcomponent data dump component containing individual software subcomponent dump data.

7. A computer system, comprising:
   at least one host;
   at least one storage; and
   a storage area network which includes at least one storage control unit configured to control the storage in response to input/output requests transmitted by the host; and
   wherein at least one of the host, the storage area network and the storage has a memory configured to store a data dump having available dump data, and dump data collection management logic configured to store in the memory, a data structure defining a set of data dump components of the data dump, each data dump component of the set of data dump components containing a portion of the available dump data, is identified by a component identification, and has associated therewith a component collection time identifying a component collection time to collect the portion of the available dump data contained in the data dump component, the dump data collection management logic including a processor and a computer program product wherein the computer program product comprises a computer readable storage medium having program instructions embodied therewith, the program instructions executable by a processor of the dump data collection management logic to cause processor operations, the processor operations comprising:
   receiving selection of a variable number of data dump components including at least a first data dump component from the set of data dump components;

determining whether a total component collection time for the selection of data dump components exceeds a predetermined maximum component collection time; and providing a request requesting dump data collection of the dump data contained in the selection of data dump components if the total component collection time for the selection of data dump components does not exceed the predetermined maximum component collection time.

8. The computer system of claim 7, wherein the processor operations further comprise:
receiving a selection completion indication of completion of component selection; and
wherein the determining whether the total component collection time for the selection of data dump components exceeds the predetermined maximum component collection time, is in response to a selection completion indication.

9. The computer system of claim 8 wherein the dump data collection management logic includes data dump component selection logic configured to receive selection of a variable number of data dump components and to ensure that the total component collection time for the selection of data dump components does not exceed the predetermined maximum component collection time, and wherein the data dump component selection logic includes user selection interface logic configured to receive user selection of at least one data dump component from the set of data dump components and to ensure that the total component collection time for the selection of data dump components does not exceed the predetermined maximum component collection time.

10. The computer system of claim 7 wherein the dump data collection management logic includes data dump component selection logic configured to receive selection of a variable number of data dump components and to ensure that the total component collection time for the selection of data dump components does not exceed the predetermined maximum component collection time, and wherein the data dump component selection logic includes exception handler selection logic configured to select as a function of a detected error at least one data dump component from the set of data dump components and to ensure that the total component collection time for the selection of data dump components does not exceed the predetermined maximum component collection time.

11. The computer system of claim 7 wherein the dump data collection management logic includes data dump component collection logic configured to receive the request requesting collection of the dump data contained in the selection of data dump components, suspend input/output operations of central processing units (CPUs), identify the dump data contained in the selection of data dump components of the request, and collect identified dump data contained in the selection of data dump components of the request, wherein the total component collection time for the selection of data dump components does not exceed the predetermined maximum component collection time.

12. The computer system of claim 7 wherein the dump data collection management logic includes data dump component selection logic configured for selection of a variable number of data dump components so that the total component collection time for selected data dump components does not exceed the predetermined maximum component collection time.

13. The computer system of claim 7 wherein the data dump components include at least one of a general system data dump component containing general system dump data, a message queue data dump component containing message queue dump data, a trace buffer data dump component containing trace buffer dump data, a task control block data dump component containing task control block dump data, and an individual software subcomponent data dump component containing individual software subcomponent dump data.

14. A computer program product for dump data collection management logic wherein the computer program product comprises a computer readable storage medium having program instructions embodied therewith, the program instructions executable by a processor of the dump data collection management logic to cause processor operations, the processor operations comprising:
receiving selection of a variable number of data dump components including at least a first data dump component from a set of data dump components;
determining whether a total component collection time for the selection of data dump components exceeds a predetermined maximum component collection time; and
providing a request requesting dump data collection of the dump data contained in the selection of data dump components if the total component collection time for the selection of data dump components does not exceed the predetermined maximum component collection time.

15. The computer program product of claim 14, wherein the processor operations further comprise:
receiving a selection completion indication of completion of component selection; and
wherein the determining whether the total component collection time for the selection of data dump components exceeds the predetermined maximum component collection time, is in response to a selection completion indication.

16. The computer program product of claim 15 wherein the dump data collection management logic includes data dump component selection logic configured to receive selection of a variable number of data dump components and to ensure that the total component collection time for the selection of data dump components does not exceed the predetermined maximum component collection time, and wherein the data dump component selection logic includes user selection interface logic configured to receive user selection of at least one data dump component from the set of data dump components and to ensure that the total component collection time for the selection of data dump components does not exceed the predetermined maximum component collection time.

17. The computer program product of claim 14 wherein the dump data collection management logic includes data dump component selection logic configured to receive selection of a variable number of data dump components and to ensure that the total component collection time for the selection of data dump components does not exceed the predetermined maximum component collection time, and wherein the data dump component selection logic includes exception handler selection logic configured to select as a function of a detected error at least one data dump component from the set of data dump components and to ensure that the total component collection time for the selection of data dump components does not exceed the predetermined maximum component collection time.

18. The computer program product of claim 14 wherein the dump data collection management logic includes data dump component collection logic configured to receive the request requesting collection of the dump data contained in the selection of data dump components, suspend input/output operations of central processing units (CPUs), identify the dump data contained in the selection of data dump components of the request, and collect identified dump data contained in the selection of data dump components of the request, wherein the total component collection time for the selection of data dump components does not exceed the predetermined maximum component collection time.

19. The computer program product of claim 14 wherein the dump data collection management logic includes data dump component selection logic configured for selection of a variable number of data dump components so that the total component collection time for selected data dump components does not exceed the predetermined maximum component collection time.

20. The computer program product of claim 14 wherein the data dump components include at least one of a general system data dump component containing general system dump data, a message queue data dump component containing message queue dump data, a trace buffer data dump component containing trace buffer dump data, a task control block data dump component containing task control block dump data, and an individual software subcomponent data dump component containing individual software subcomponent dump data.

* * * * *